(12) United States Patent
Milioto et al.

(10) Patent No.: US 12,310,283 B2
(45) Date of Patent: May 27, 2025

(54) METHOD AND APPARATUS FOR MODELING AN ENVIRONMENT PROXIMATE AN AUTONOMOUS SYSTEM

(71) Applicant: Scythe Robotics, Inc., Longmont, CO (US)

(72) Inventors: Andres Leonardo Milioto, Thornton, CO (US); Nicholas Stephen Peretti, Boulder, CO (US); Kevin Eliot Stone, Westminster, CO (US)

(73) Assignee: Scythe Robotics, Inc., Longmont, CO (US)

( * ) Notice: Subject to any disclaimer, the term of this patent is extended or adjusted under 35 U.S.C. 154(b) by 491 days.

(21) Appl. No.: 17/329,858

(22) Filed: May 25, 2021

(65) Prior Publication Data

US 2022/0377973 A1 Dec. 1, 2022

(51) Int. Cl.
*G06T 7/593* (2017.01)
*A01D 34/00* (2006.01)
(Continued)

(52) U.S. Cl.
CPC ........... *A01D 34/008* (2013.01); *G06F 17/17* (2013.01); *G06F 18/23* (2023.01); *G06N 3/02* (2013.01); *G06T 7/174* (2017.01); *G06T 7/593* (2017.01); *G06T 7/77* (2017.01); *G06T 2207/10012* (2013.01); *G06T 2207/10028* (2013.01);
(Continued)

(58) Field of Classification Search
CPC ....... A01D 34/008; G06F 17/17; G06F 18/23; G06N 3/02; G06N 3/088; G06T 7/174; G06T 7/593; G06T 7/77; G06T 2207/10012; G06T 2207/10028; G06T 2207/20084; G06T 2207/30252; G05D 2201/0208; G05D 1/0251; G06V 20/58; G06V 20/56; G06V 20/64; G01S 13/862; G01S 13/865; G01S 13/867; G01S 13/89;
(Continued)

(56) References Cited

U.S. PATENT DOCUMENTS 8,565,958 B1* 10/2013 Montemerlo .......... G05D 1/024
701/28
2014/0225990 A1* 8/2014 Einecke .................. G06T 7/593
382/104
(Continued)

FOREIGN PATENT DOCUMENTS

CN 110612492 A 12/2019
EP 0664018 B1 7/1997
(Continued)

OTHER PUBLICATIONS

PCT International Search Report and Written Opinion for Application No. PCT/US2022/030470 dated Sep. 8, 2022, 11 pgs.

*Primary Examiner* — Faris S Almatrahi
*Assistant Examiner* — Dana F Artimez
(74) *Attorney, Agent, or Firm* — Moser Taboada

(57) ABSTRACT

A method and apparatus for modeling the environment proximate an autonomous system. The method and apparatus accesses vision data, assigns semantic labels to points in the vision data, processes points that are identified as being a drivable surface (ground) and performs an optimization over the identified points to form a surface model. The model is subsequently used for detecting objects, planning, and mapping.

20 Claims, 6 Drawing Sheets

(51) Int. Cl.

| | | |
|---|---|---|
| *G01S 13/89* | (2006.01) | |
| *G06F 17/17* | (2006.01) | |
| *G06F 18/23* | (2023.01) | |
| *G06N 3/02* | (2006.01) | |
| *G06T 7/174* | (2017.01) | |
| *G06T 7/77* | (2017.01) | |
| *G06V 20/56* | (2022.01) | |

(52) U.S. Cl.
CPC ............... *G06T 2207/20084* (2013.01); *G06T 2207/30252* (2013.01)

(58) Field of Classification Search
CPC ...... G01S 15/931; G01S 17/89; G01S 17/931; G01S 2013/9323; G01S 2013/9324
See application file for complete search history.

(56) References Cited

U.S. PATENT DOCUMENTS

| | | |
|---|---|---|
| 2015/0296707 A1 | 10/2015 | Fukuda et al. |
| 2016/0012633 A1* | 1/2016 | Wei ..................... G06T 7/593 345/420 |
| 2017/0344020 A1 | 11/2017 | Grufman et al. |
| 2018/0077860 A1 | 3/2018 | Einecke et al. |
| 2018/0103579 A1 | 4/2018 | Deimert et al. |
| 2018/0139896 A1 | 5/2018 | Wahlgren |
| 2018/0339409 A1 | 11/2018 | Bal et al. |
| 2018/0361584 A1 | 12/2018 | Bal et al. |
| 2018/0364045 A1 | 12/2018 | Bal et al. |
| 2019/0049968 A1 | 2/2019 | Dean et al. |
| 2019/0164018 A1* | 5/2019 | Zhu ..................... G06F 18/251 |
| 2020/0068799 A1 | 3/2020 | Slembrouck et al. |
| 2021/0287385 A1* | 9/2021 | Watson ................ G05D 1/0274 |
| 2022/0024485 A1* | 1/2022 | Theverapperuma ......................... G06V 20/588 |

FOREIGN PATENT DOCUMENTS

| | | |
|---|---|---|
| EP | 2286653 A2 | 2/2011 |
| JP | 3318170 B2 | 8/2002 |
| WO | WO-2016103065 A1 | 6/2016 |
| WO | WO-2018000922 A1 | 1/2018 |
| WO | WO-2018142482 A1 | 8/2018 |
| WO | WO-2018153599 A1 | 8/2018 |
| WO | WO-2018224678 A1 | 12/2018 |
| WO | WO-2019032864 A1 | 2/2019 |
| WO | WO 2020-023982 A2 | 1/2020 |

\* cited by examiner

METHOD AND APPARATUS FOR MODELING AN ENVIRONMENT PROXIMATE AN AUTONOMOUS SYSTEM

BACKGROUND

Autonomous systems, for example, autonomous vehicles and/or robots, rely on sensors to understand the environment proximate to the autonomous system and enable autonomous operation within the environment such as, for example, navigating a given terrain. Latency in making decisions (e.g., motion planning) may lead to inaccurate operation and, more seriously, to dangerous operation that may harm people or property. The signals and data generated by sensors mounted to an autonomous system may be very noisy and require a substantial amount of computer processing to achieve accurate modeling of the environment. Various autonomous systems typically lack the processing capability necessary for creating environmental models in real-time for safe and proper traversal of the terrain.

BRIEF DESCRIPTION OF THE DRAWINGS

The invention will now be described, by way of example, with reference to the accompanying drawings, where like numerals denote like elements, a leftmost numeral indicates the original figure in which the element is found, and in which.

DETAILED DESCRIPTION

Figure 1:
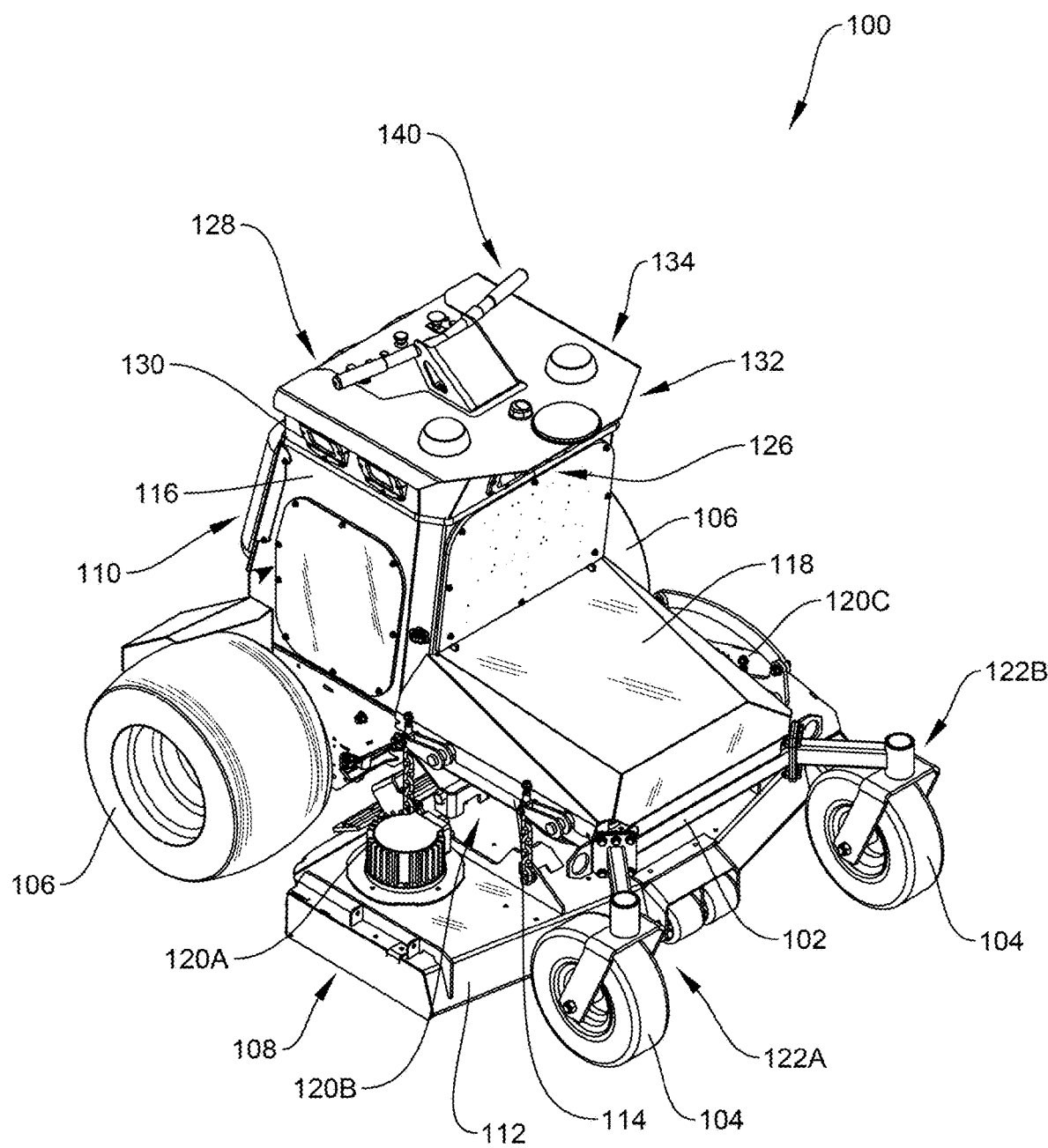
FIG. 1 is a front perspective view of an autonomous system in the form of an autonomous lawn mower in accordance with at least one example of the invention.

The following detailed description describes techniques (e.g., methods, processes, and systems) that may be used by an autonomous system to produce a model of an environment proximate the autonomous system. In those examples described in detail herein the autonomous system is, for example, an autonomous lawn mower. However, the techniques described herein may apply to any situation where noisy sensor data is used to produce a model of an environment proximate any form of autonomous system, e.g., robot, vehicle, etc.

In one example, the mower comprises a suite of sensors to enable the mower to gather environmental information to understand its environment. The information is locally processed to enable the mower to generate at least one model of a surface upon which the mower is traveling and include in the model objects that the mower is to avoid. The model generation process uses machine learning (artificial intelligence) to characterize surfaces and objects, e.g., grass, sidewalk, driveway, tree, person, hard object, etc., that are within the sensors' field of view. The at least one model is made available to a planning function that plans the next incremental movement of the mower in view of the content of the model.

In various examples, the mower uses one or more sensors capable of generating data representing the environment proximate the mower that when such data is processed is capable of forming a three-dimensional representation of the environment. Such one or more sensors may include monocular cameras, stereo cameras, LIDAR, RADAR, or a combination thereof.

In various examples, image data received from one or more cameras may be input into a machine learned model trained to segment various classes and generate segmentation data. In some such examples, the segmentation operation may be a binary classifier (e.g., drivable surface or not), whereas in other examples, the classifier may classify a set of drivable surfaces (e.g., grass, sidewalk, etc.) and non-drivable surfaces (persons, trees, shrubs, etc.).

Such image data may comprise image data from one of multiple image sensors about the autonomous system (either spatially or temporally (e.g., multiple images captured in a series in time may be considered multiple image sensors)). In addition to segmentation, multiple images from the one or more image sensors may be used to determine a depth estimate of the surrounding environment proximate the autonomous system. In various examples, images from two cameras may be scanline rectified and a simple scanline matching search may be performed to determine a depth. Of course, any multi-view geometry may be used (in addition to, or alternatively to, a machine learned (e.g., neural network) model for determining depth from monocular images, multiple images, etc.).

In at least some examples, the depth estimates may be determined based at least in part on the subset of the image data associated with drivable surfaces. Alternatively, only those subsets of the depth data associated with drivable surfaces may be determined. In various examples, depth data from multiple pairs of cameras may be determined so that depth estimates are provided around the entirety of the autonomous system. In those examples in which the autonomous system is a lawn mower on which an operator is riding, at least a portion of depth data may not be determined (e.g., the portion associated with cameras that are obscured by the presence of the operator). Regardless, the operations above describe determining depth estimates for a portion of sensor (e.g., image) data associated with drivable surfaces.

Once determined, such depth data may be used to estimate a multivariate surface. Outlier rejection techniques may be used (such as RANSAC) in conjunction with optimization techniques (e.g., non-linear or linear least squares) to determine a multivariate polynomial function which is representative of the surface proximate the autonomous system up to some boundary. In such examples, the outlier rejection may ensure that only those points that are errant points are not used that would otherwise distort the optimization results. The use of the multivariate (e.g., two-dimensional) polynomial reduces the parameter space for optimization, reducing the computational requirements for performing the optimization and increasing the speed of convergence. As a non-limiting example, the surface may be defined by:

$$z = a + bx + cy + dxy + e(x^2) + f(y^2) + g(x^2)y + h(y^2)x + i(x^3) + j(y^3)$$

where x and y are meters from the autonomous system in a top down view (forward=+y, backward=−y, port=−x and starboard=+x) and z is the altitude. Values a, b, c, d, e, f, g, h, i, and j are coefficients that are estimated using a, for example, least squares algorithm (linear, non-linear, etc.). Of course, higher order and/or non-linear terms may be added in some examples, though more terms than those included in the above may increase computational complexity and risk overfitting data.

Once the surface is determined, the depth map of the entire environment may be used to cluster objects. As a non-limiting example, portions of data above the surface may be clustered together to determine objects.

The surface data, in conjunction with any objects detected, may be used to determine motions of the autonomous system (e.g., in a path planning context). As one example, the autonomous system may stop when proximate a particular object (which, in at least some examples, may be associated with a particular classification—e.g., person).

As the system moves, information about the surface may be preserved by fusing the data into a consistent height map. The height map data may be utilized in the future for added segmentation to locate and determine the presence of objects proximate the autonomous system.

The techniques described in detail above improve the functioning of a computer by enabling complex topographical modeling, object detection, and path planning using minimal computational resources. By using the techniques described in detail above, a complex terrain may be determined and used by the autonomous system while using minimal computational resources as compared to other techniques.

Example electronics and processes utilized to operate the autonomous mower are described in detail in U.S. patent application Ser. No. 16/985,495, filed 5 Aug. 2020 entitled "Autonomous Lawn Mower" (the '495 application), U.S. Provisional Patent Application Ser. No. 63/121,515, filed 4 Dec. 2020 entitled "Autonomous Lawn Mower" (the '515 application), which are both hereby incorporated herein by reference in their entireties.

Figure 2:
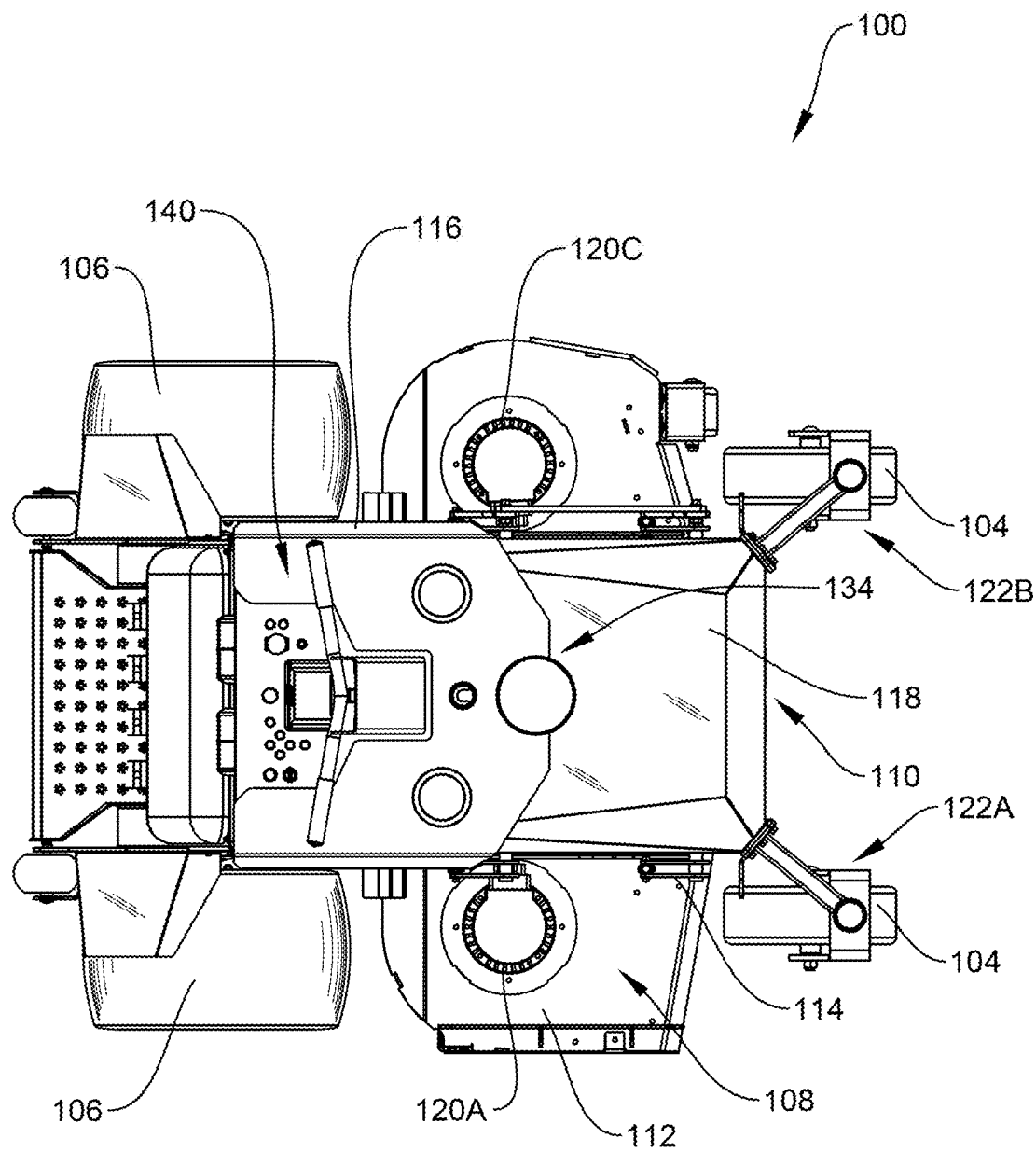
FIG. 2 is a top view of the autonomous lawn mower of FIG. 1 in accordance with at least one example of the invention.

FIGS. 1 and 2 are respectively a front perspective view and a top view of an autonomous systems in the form of an exemplary autonomous lawn mower 100 in accordance with at least one example of the invention. In at least one example of the autonomous mower 100, the mower may be powered by electricity. In other examples (whether autonomous or otherwise), the mower may have another form of energy source, e.g., gasoline, diesel, natural gas, liquid propane, fuel cell, hydrogen, or the like. The mower has one or more drive mechanisms, e.g., motors, facilitating movement of the mower as well as rotating the cutting blades, where the drive mechanism is of a type commensurate with the energy source.

As shown in FIGS. 1 and 2, the mower 100 may comprise a chassis 102, front and rear wheels 104 and 106, mower deck assembly 108, and a mower body 110. The mower deck assembly 108 comprises a mower deck 112 and a mower deck control mechanism 114. The chassis 102 may support the mower body 110, comprising a podium 116 and a hood 118, which houses batteries, motors and control electronics (internal to the body 110, thus not shown in FIGS. 1 and 2).

The mower deck control mechanism 114 that couples the chassis 102 to the mower deck 112 may comprise actuator(s) to raise and lower the mower deck 112 relative to the chassis 102 and ground as well as an actuator (e.g., motor(s) 120A, 120B, 120C) to drive one or more blades within the mower deck 112.

In an example, each rear wheel 106 may be coupled to a drive mechanism, e.g., at least one motor. For example, each wheel may be directly driven by a separate electric motor. In other examples, the drive mechanism may include a transmission and/or other form of gearing between the wheels and the motor(s). The front wheels 104 may be "free-wheeling" in that they are not driven nor are they steered. In such examples, the front wheels 104 comprise, for example, castors. Each wheel 104 may be coupled to the chassis 102 via a wheel mounting assembly 122A and 122B (e.g., a wheel mounting fork coupled to a spindle to form a castor). In this manner, steering of the mower is effectuated through applying differential rotation of the rear wheels 106. Such differential rotation may be created through rotating each wheel at the same speed and braking one wheel relative to the other or rotating each wheel at a different speed through control of independent wheel drive motors. In other examples, the rear wheels may be driven at equal speeds and a steering assembly may be used to steer the front wheels.

The exterior of the podium 116 supports various sensors including, but not limited to, forward viewing camera(s) 126, rear viewing camera(s) 128, side viewing camera(s) 130 and 132, and various radomes 134 which cover various antennas and sensors. The sensor elements used by the autonomous mower 100 and described in detail in the '495 application may include one or more of cameras (whether stereo, RGB, monochromatic, infrared, ultraviolet, hyperspectral, etc.), radar(s), lidar(s), acoustic sensors, accelerometer(s), gyroscope(s), torque sensor(s), magnetometer(s), location system(s), battery management systems, wheel encoder(s), motor sensor(s), orientation sensor(s), and/or the like. Some of these sensors may be located within the radomes 134 or located elsewhere on the mower 100.

The sensors gather information regarding the environment surrounding the autonomous lawn mower 100 such that the mower 100 creates a model of the environment proximate to the mower. Using the model, the mower is able to autonomously mow a region of lawn within a specified boundary as well as identify obstacles to be avoided, ignored, or cause the mower to cease operation and request human assistance.

In one example, the top portion 140 of the podium 116, which supports many of the sensors that detect the environment surrounding the mower 100 and supports the communications antennas, is modular, i.e., the top portion 140 is removable from the podium 116. The top portion has four sides 142A, 142B, 142C, and 142D. Each of the four sides supports cameras 126, 128, 130 and 132. By placing the cameras at the highest point on the mower 100, the cameras have an optimal view of the surrounding environment. In at least some examples, the cameras 126, 128, 130 and 132 may each comprise a stereo pair defined by a baseline (distance therebetween) that may be scan line rectified. In such examples, placement of the stereo pair in the podium may allow for wider baselines (and increased depth resolution).

Figure 3:
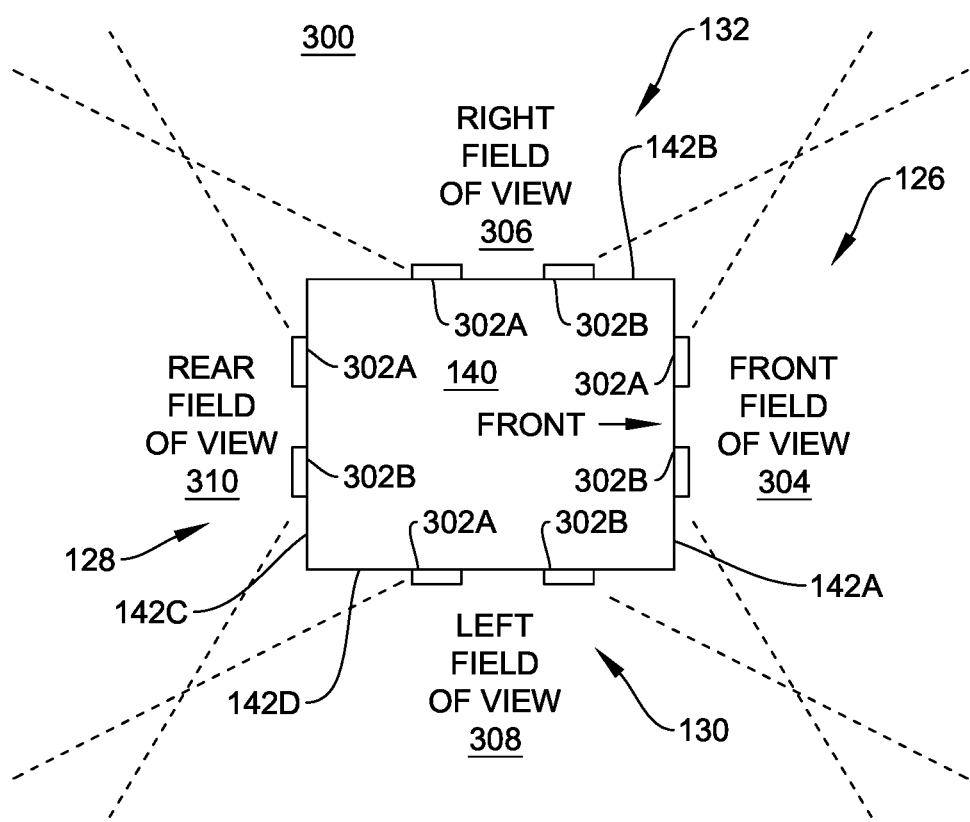
FIG. 3 is a schematic top view of the sensor array of the autonomous lawn mower of FIG. 1 in accordance with at least one example of the invention.

FIG. 3 is a schematic top view of the sensor array 300 of the autonomous lawn mower 100 of FIG. 1 in accordance with at least one example of the invention. As mentioned above, mounted to the four sides 142A-D of the podium top portion 140 are a plurality of stereo cameras 126, 128, 130 and 132. Each stereo camera 126, 128, 130 and 132 may comprise a pair of horizontally oriented, camera elements 302A and 302B mounted to each side 142A-D of the top portion 140. In one example, the camera elements 302A and 302B are spaced apart by about 88.9 mm to facilitate adequate stereo imaging of the environment. In another example, the baseline separation between the cameras is about 17 or 18 cm. In various examples, such a baseline may be tailored for the particular application based on relative depths. In one example, each side and rear camera 128, 130 and 132 has a 130 degree diagonal field of view angle, while the front camera 126 may have a narrower viewing angle, such as, a 100 degree field of view angle. The field of view of each camera pair is indicated by dashed lines (i.e., front, right, left and rear field of views are respectively indicated at 304, 306, 308, and 310). The front camera 126 has a slightly narrower field of view to improve forward depth perception. With such a field of view from each camera, the cameras provide 360 degree imaging of the surrounding environment. To reduce image distortion, the field of view may be narrowed for each camera, but to maintain a 360 degree view of the surrounding area, the diagonal field of view should not be less than 90 degrees, e.g., 90 degree diagonal field of view may be used. In at least some examples, various combinations of cameras may be used (e.g., wide angle, narrow angle, fish-eye, etc.) to provide for various factors. For example, a wide-angle camera may be better suited for use in determining an obstacle proximate the system as opposed to a narrow field of view lens which may be preferred for determining objects further away. Of course, image data from any such camera may be undistorted, rectified, or otherwise manipulated to provide optimal data for sensing, planning, and control. In one example, the camera elements 302A and 302B have a 130 degree diagonal field of view and are available from D3 Manufacturing as Model 10650 (part number 1001149-27). In one example, the individual cameras in a camera pair are spaced apart by about 88.9 mm, though any spacing is contemplated for a desired depth resolution.

In at least some examples, to facilitate use of limited computing resources and optimize image processing speed, the images from the stereo camera pairs may be scan line rectified. The scanline rectification ensures alignment of the scanlines of images generated by all the cameras. Alignment is performed on a sub-pixel basis, i.e., quarter-pixel alignment. In some such examples, subpixel fitting may be done via interpolation techniques. In addition, lens unwarping and other image processing may be applied to remove image distortions created by the camera lenses.

Figure 4:
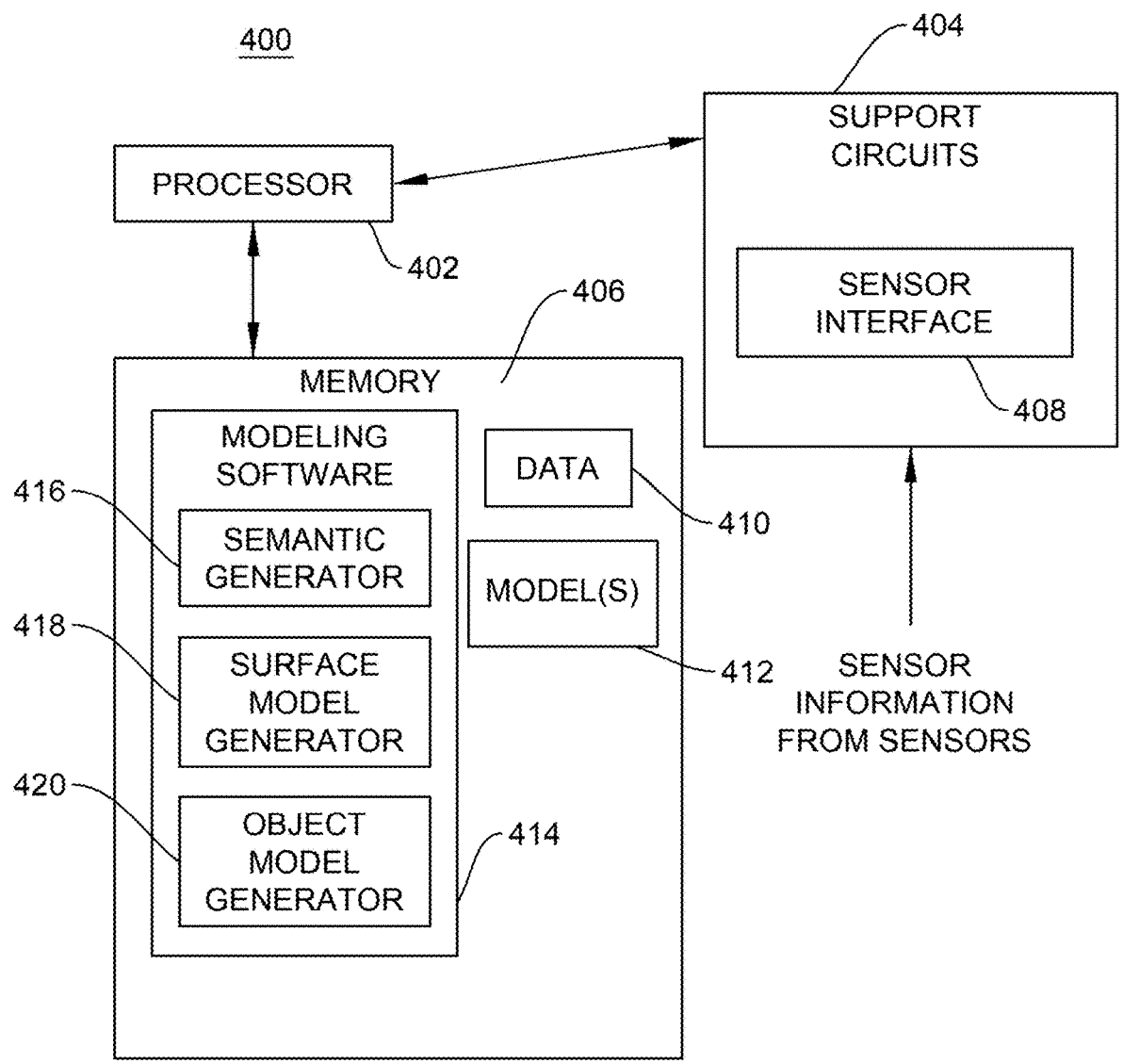
FIG. 4 is a block diagram of a sensor signal processing system of an autonomous system in accordance with at least one example of the invention.

FIG. 4 depicts a block diagram of an environmental model generation system 400 in accordance with at least one example of the invention. Any block, step, module, or otherwise described below may represent one or more instructions which can be stored on a non-transitory computer readable media as software and/or performed by hardware. Any such block, module, step, or otherwise can be performed by various software and/or hardware combinations in a manner which may be automated, including the use of specialized hardware designed to achieve such a purpose. As above, any number of blocks, steps, or modules may be performed in any order or not at all, including substantially simultaneously, i.e., within tolerances of the systems executing the block, step, or module. Of course, such blocks are presented for illustration purposes only and any one or more block, step, or module may be combined with any other, removed, split, or moved between the various systems and subsystems illustrated.

The environmental model generation system 400 processes sensor information (e.g., stereo camera images such as vision data comprising an array of points) to generate a model of the environment proximate to the mower. The system 400 may comprise at least one processor(s) 402, support circuits 404, and memory 406. The processor 402 may include one or more processors as part of the processor(s) 402, any of which, either individually or in combination, are capable of performing the operations described herein. For example, the processor(s) 402 may comprise, one or more or any combination of, microprocessors, microcontrollers, central processing units (CPUs), graphics processing units (GPUs), digital signal processors (DSPs), field programmable gate arrays (FPGAs), application specific integrated circuits (ASICs), or the like. In one example, the processor 402 may include a model Jetson Xavier computing module available from Nvidia Corporation.

The support circuits 404 may comprise circuits and devices that support the functionality of the processor(s) 402. The support circuits 404 may comprise, one or more or any combination of: clock circuits, communications circuits, cache memory, power supplies, interface circuits for the various sensors, actuators, and communications circuits, and the like. More specifically, the support circuits 404 may comprise a sensor(s) interface 408. The sensor(s) interface 408 may support data transfer from the cameras in FIG. 3 to the processor(s) 402 through one or more, or any combination of, data buffering/caching, signal digitizing, signal amplification, digital and/or analog signal processing, filtering, limiting, and/or the like.

Memory 406 is an example of one or more non-transitory computer readable media capable of storing instructions which, when executed by any of the one or more processor(s) 402, cause the processor(s) 402 to perform any one or more operations to process the sensor information as described herein. The memory 406 can store an operating system and one or more software applications, instructions, programs, and/or data to implement the methods described herein and the functions attributed to the various systems. In various implementations, the memory 406 can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein. Additionally, or alternatively, the memory 406 is capable of storing raw, compressed, downsampled or otherwise processed sensor data (e.g., data 410) from the one or more sensor(s) and/or output of one or more machine learning models (e.g., model(s) 412).

The memory 406 may store various programs and data such as, for example, but not limited to, a modeling program 414. The modeling program 414, when executed, utilizes the sensor data 410, e.g., camera images, to produce one or more models 412 of the environment proximate the mower. More specifically, the modeling program 414, when executed, accesses the sensor information (i.e., vision data) and processes the sensor information using a semantic generator 416, a surface model generator 418, and an object model generator 420. The operation of the program 414 and its subcomponents 416, 418 and 420 is described below with respect to FIG. 5.

At the end of each processing interval (e.g., 100 mS or less), the program 414 outputs at least one model of the surface upon which the mower is operating and obstacles near the mower. The surface model extends a predefined distance from the mower, e.g., ten meters. Of course, other distances may be modeled. Additionally, as described in detail with reference to FIG. 5 below, the program 414 assigns each point in the at least one model a semantic label such as grass, sidewalk, tree, person, branch, etc. to facilitate segmentation and processing of the data. The model and related semantics are coupled to a planning subsystem that uses the model and semantics to plan the next incremental movement of the mower. The model generation process then repeats for the next processing interval. In one example, each about 100 mS a new at least one model is generated. As will be described in more detail below, each model may be fused with a previously generated model or sequence of models to form a comprehensive and extensive model of the environment. In one example, the models are fused using weighted averaging such that newly generated models are weighted more highly than previously generated models. In such examples, a buffer may store a heightmap (e.g., two-dimensional representation) of the environment with much larger extents than determined when estimating the surface. As such, the comprehensive model may be used for odometry, localization, and mapping much larger areas.

The system 400 may learn over time which semantic categories to apply to the objects and surfaces using a machine learning algorithm Such learned information may be shared amongst mowers such that, collectively, mowers may learn from each other's experiences.

Figure 5:
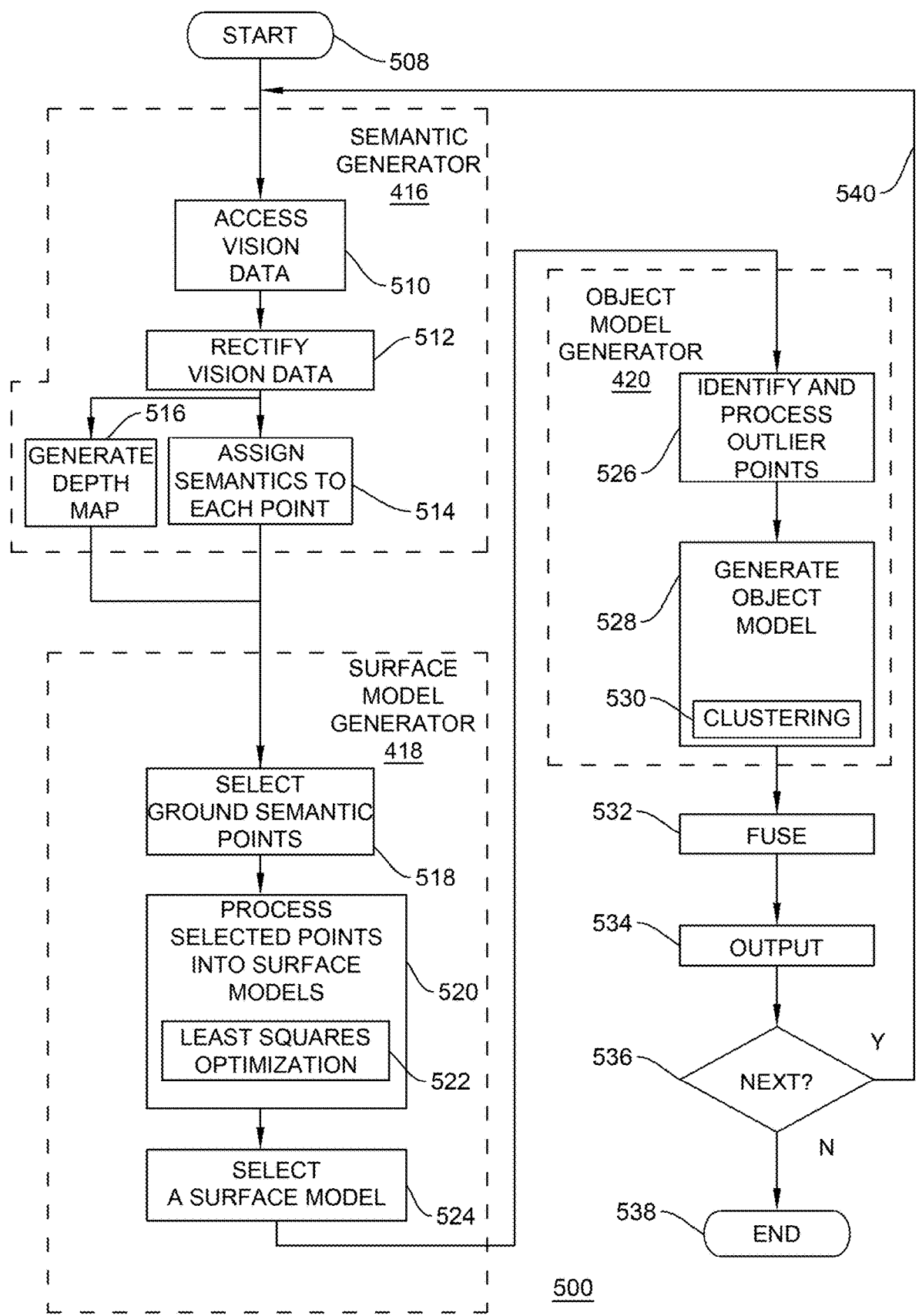
FIG. 5 is a flow diagram of a method of processing sensor signals of an autonomous system in accordance with at least one example of the invention.

FIG. 5 depicts a flow diagram of a method 500 of operation of the modeling program 414 of FIG. 4 in accordance with at least one example of the invention. Any block, step, module, or otherwise described below may represent one or more instructions which can be stored on a non-transitory computer readable media as software and/or performed by hardware. Any such block, module, step, or otherwise can be performed by various software and/or hardware combinations in a manner which may be automated, including the use of specialized hardware designed to achieve such a purpose. As above, any number of blocks, steps, or modules may be performed in any order or not at all, including substantially simultaneously, i.e. within tolerances of the systems executing the block, step, or module. Of course, such blocks are presented for illustration purposes only and any one or more block, step, or module may be combined with any other, removed, split, or moved between the various systems and subsystems illustrated.

The method 500 may comprise three main components: a semantic generator 416, a surface model generator 418, and an object model generator 420. The functions of the surface model generator 418 and object model generator 420 may be performed in sequence, in any order, or substantially simultaneously (e.g., within technical tolerances and/or such that processes performed by one component occur for at least a portion of time processes are performed by another component). The semantic generator 416 produces segmentation data where each image point is assigned a semantic label that categorizes the point as being an element of an image scene, e.g., ground, non-ground, drivable surface, non-drivable surface, grass, sidewalk, tree, person, fence, etc. The semantic labeling is used to segment and process the image points. The semantic generator 416 also produces a depth map of the environment surrounding the autonomous system. The surface model generator 418 processes portions of the depth map where the vision data is classified as regions that form the "drivable surface" to generate a surface model of the surface proximate the autonomous system. Lastly, an object model generator 420 processes portions of the depth map where the vision data is classified as objects that are "not ground" to produce an object model. Details of each main component 416, 418, and 420 are described below.

The method 500 begins at 508 within the semantic generator 416 and proceeds to 510 where the method 500 accesses (or otherwise receives) vision data as captured from the cameras and stored in memory (i.e., arrays of pixels captured by each camera). The exposure time for generating the vision data may be, for example, about 4 to 8 mS.

At 512, the vision data is rectified to align multiple images (e.g., two, three, five, eight, etc.) with one another on a scanline basis. Additional processing may occur to sub-sample, filter, and interpolate vision data as well as remove lens effects (e.g., lens dewarping) to achieve alignment on a sub-pixel level (e.g., on a quarter-pixel level). The vision data comprises a plurality of pixels in a two-dimensional array and the output of the rectification processing is a three-dimensional point space. In some examples, as described above, a depth may be determined for each associated pixel and/or only those pixels with a corresponding semantic classification of drivable surface.

The functions at 514 and 516 may be performed in sequence, but may also be performed in parallel, as shown. As shall be evident from the following description, the functions performed at 514 and 516 are independent.

At 514, the method 500 assigns a semantic label to categorize each point in the rectified vision data. In essence, the method 500 creates segmentation data where each point is assigned a specific semantic label describing an object within which the point is contained. Such segmentation data may be used for segmenting the rectified vision data to facilitate further processing of specific portions of the data. For example, the method 500 may assign categories such as ground, not ground, person, hard object, soft object, etc. These categories may be further subcategorized such that "ground" may be identified as grass, sidewalk, asphalt, etc. The "not ground" category may be further subcategorized as wall, tree, branch, furniture, etc. Categorization of hard object and soft object may also be further subcategorized, but they may not be. The planning subsystem will treat all hard objects as an object to be avoided (e.g., mow around), while soft objects (e.g., leaves) are considered "mowable" such that the mower will not stop or avoid the object.

Depending on the network architecture, the function performed at 514 inspects each point as well as the points surrounding a given point. For example, a first layer of processing may process a 3×3 point processing window to identify color correspondences, boundary indications, and the like (e.g., by increasing and, subsequently decreasing the receptive field for layers in the network). The image processing is performed using an encoder-decoder neural network architecture with skip connections to enhance denoising of the processing. This architecture uses a layer-by-layer approach to analyze larger and larger point windows, e.g., layer 1 is 3×3, layer 2 is 4×4, and so on until the final layer of processing uses an entire image to achieve a global context. The outcome is an accurate categorization of every point in the processed vision data, i.e., each point is assigned a semantic to describe what the point represents in the environment proximate the autonomous system (e.g., mower). The semantic information may be used to segment portions of the depth map for specific processing.

At 516, the method 500 uses epipolar geometry to generate a depth map that assigns to each point in the vision data a distance (or depth) from a reference location on the mower. The process combines the two-dimensional images from each camera of a stereo camera to produce a three-dimensional point cloud. Thus, each point is defined by a semantic, a three-dimensional location in space (i.e., a two-dimensional position and a distance from the mower). The location of a point may be a geo-location, a location relative to the mower, or a location relative to some other reference point.

After the semantic generator 416 has assigned semantics to each point and a depth map is generated, the method 500 continues to the surface model generator 418. Note that the semantic assignment and depth map generation do not have to be performed in sequence or in any specific order. For example, the depth map and semantic assignment may be performed in parallel (simultaneously).

At 518, the method 500 selects the points that have been assigned a ground semantic. Not all the ground semantic points are processed to form the surface model. A subset of the total number of points is selected for surface model processing. The point selection may be performed randomly; however, it is a better practice to use a biased random selection to ensure the points are uniformly selected across the depth map and not clustered in a single area or all lie near an edge. At 520, the method 500 processes the selected points ("ground" points) into a plurality of surface models. The selected points assigned a ground semantic label are processed using a robust outlier estimation technique, for example, RANSAC (random sample consensus algorithm), to ensure the points that are being used to generate the surface models do not contain a large number of outlier points (i.e., points that are not near the surface being modeled. RANSAC, for example, is an iterative algorithm capable of performing a robust fitting of data to a surface using data that may contain a large number of surface outliers. In one or more examples, RANSAC may be augmented with machine learning, where the machine learning algorithm selects points for an accurate initial surface and apply RANSAC to the points associated with the initial surface.

At 522, a least squares optimization over a multi-dimensional function (i.e., polynomial) is used to fit a three-dimensional surface to the depth data. In at least some examples in which a previous model of the surface is known (e.g., from the rolling height map buffer described in detail below and/or from a previously determined map), such a surface estimate optimization may be seeded with the information of the surface determined. The process is repeated several times using various sets of depth points selected by the RANSAC algorithm to produce a set of surface models. As a non-limiting example, a surface may be defined by:

$$z=a+bx+cy+dxy+e(x^2)+f(y^2)+g(x^2)y+h(y^2)x+i(x^3)+j(y^3)$$

where x and y are meters from the autonomous system in a top down view (forward=+y, backward=−y, port=−x and starboard=+x) and z is the altitude. Values a, b, c, d, e, f, g, h, i, and j are coefficients that are estimated using the, for example, linear least squares algorithm. In other examples, a non-linear least squares algorithm may be used.

At 524, a most accurate surface model (e.g., least error, most number of inliers, least number of outliers, etc.) is selected from the set as the final surface model representing the surface proximate the mower at the instant in time the cameras captured the vision data. To find the surface with the least error, the method 500 may, for example, determine the surface model in the set of surface models that contains the largest number of inlier points. Such a process may test the plurality of surface models simultaneously. The number of surface models that are generated may vary with the accuracy of the modeling, i.e., the less outliers in the surface, the less the number of surface models are necessary. The noisier the data, requires more surface models. The number of surface models may vary, for example, from 1 to 40, but could be any number depending on the available processing power of the at least one processor.

Once the surface model is generated, the method 500 continues to the object model generator 420. At 526, the method 500 identifies points that are not included in the surface model (e.g., outlier points that are not categorized as ground points). The method 500 discretizes the model into a grid of cells, e.g., 15 cm square cells, but other size cells could be used. The method then iterates over the model to find all points that are above the surface by a predefined distance, e.g., about 30 cm, and determines a number of such points located in each cell. If a predefined number of points (i.e., a critical mass) resides in a given cell, the cell is considered to be an occupied cell and deemed to contain an obstacle. The result is a two-dimensional occupancy grid defining the location of obstacles proximate the mower. At 528, the method 500 generates an object model using point clustering 530. In some examples, such clustering may comprise connected nearest neighbors, next nearest neighbors, and the like. In various examples, connections may be based on the associated semantic classification. As such, the points in a region having the same semantic label are clustered into objects that do not lie in the surface model (i.e., the objects extend out of the surface model). These objects are combined with the surface model to produce a comprehensive model of the environment proximate the mower.

At 532, the method 500 may fuse (aggregate) the most recently generated model with previously generated model (s) to produce a global height map. Such fusion may be performed using an additional buffer storing a height map in two dimensions. In various examples, the global height map may comprise a larger area than estimated using the surface estimation described in detail above. As the mower moves in its environment and produces environmental models, the global map is updated with each new model. This global map may be used to seed the surface model generator to improve surface modelling by increasing the points known to be within the surface. The global map is formed in a rolling buffer. The information added to the rolling buffer may be weighted to allow newer data to have a larger impact on the global height map than older data, e.g., an exponential decay, linear weighting based on time and/or distance, or the like. Fusing may be further based at least in part on motion in between surface estimates determined by a localization component (described in detail above), dead reckoning using onboard sensors, and/or odometry based on the surface itself.

At 534, the method 500 outputs the fused height map and the semantics associated with the surface and objects. This output is coupled to the mower's planning subsystem to plan movement of the mower during the next processing increment. In at least some examples, data (e.g., depth estimates determined) above the estimated surface by some threshold amount (e.g., 30 cm) may be segregated and subsequently clustered to determine detections of objects in the environment. The corresponding heightmap may encode such object information by associating a semantic class with the corresponding grid cell of the height map. The resulting surface, heightmap, and/or objects may then be used for determining mower actions. For example, based on the modeling output, the mower may invoke an emergency stop procedure to avoid a detected object, such as a person. Alternatively, the mower may continue with the current mower speed and blade speed to continue mowing or the mower may power one drive motor more than the other to begin or continue a turn to avoid an obstacle.

In addition, the global height map may be used to adjust and/or optimize mow patterns for the mower either for the current mowing task or for future mowing tasks at the same property.

At 536, the method queries whether another model is to be generated. If the query is affirmatively answered, the method 500 returns along path 540 to the semantic generator 502 to begin creating a new model based on the next set of captured vision data. In one example, a model is generated every 100 ms. If the query at 536 is negatively answered, the method 500 proceeds to 538 and ends.

In one or more examples, the autonomous system may generate an environment model without assigning semantics that facilitate the use of segmentation data at 514. As such, the method 500 would generate the surface model and object model based upon at least a subset of the depth map. In such an example, the method 500 may select points for processing into the surface model without regard for the points being assigned a "drivable" semantic and would not use the "drivable" semantic to segment the depth data. Instead, RANSAC and the least squares optimization may be applied to the selected points to generate the surface model and the depth map would be used to determine points that did not reside in the surface as objects. In this manner, the method would generate the surface and object models that may be fused into a global height map as described above without using segmentation data.

In some examples, the point may be an aggregation of pixels known as a voxel. A voxel may store a statistical aggregation of a plurality of data in a defined region (e.g., a number of measurements, an average location in the voxel, covariances, etc.). A voxel may, for example, be a 10 cm cube. In an example, each measurement (or data) whether stored as a voxel grid and/or a global rolling buffer heightmap (as described in detail above) may be statistically weighted to form the voxel. In this manner, specific pixels may be upweighted to increase their impact on the voxel or downweighted to reduce a pixel's impact on the voxel. Such weighting may ensure that a voxel containing a large number of pixels having a first pixel semantic (e.g., grass) and a smaller number of pixels having a second pixel semantic (e.g., stump), will not be defined as grass. Avoiding a stump is very important to avoid damage to the mower and, as such, "stump" semantic pixels are upweighted.

Figure 6:
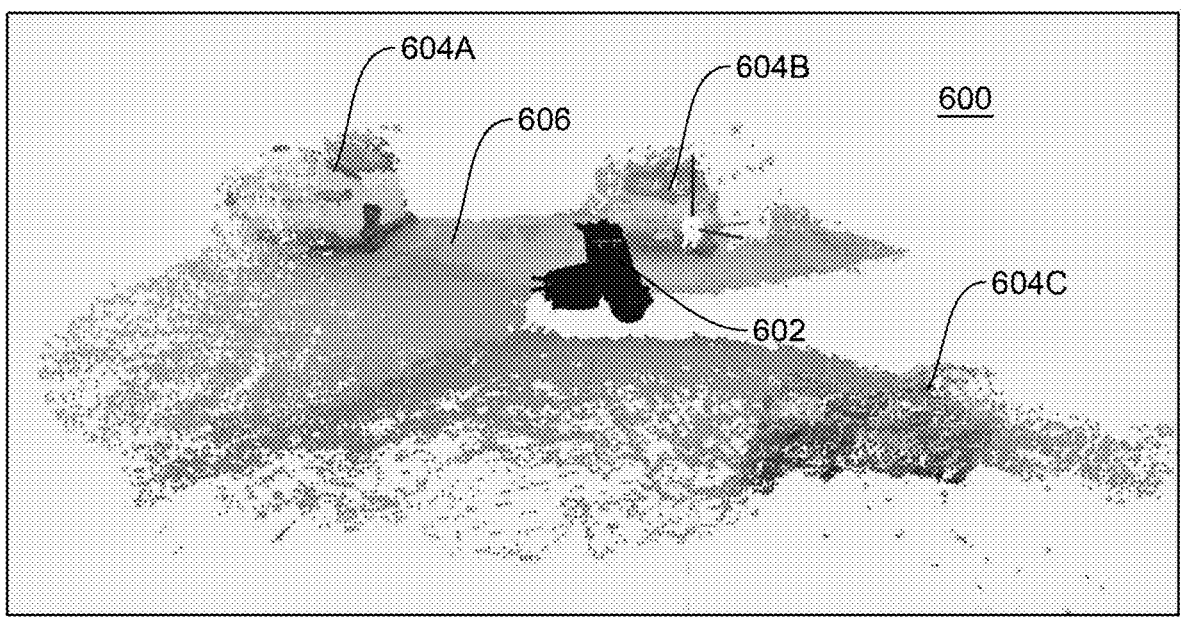
FIG. 6 depicts a graphical representation of a model of an environment proximate an autonomous system generated in accordance with at least one example of the invention.

FIG. 6 is a graphical representation of a model 600 of an environment proximate an autonomous lawn mower 602 in at least one example of the invention. The model 600 comprises a plurality of objects 604A, 604B and 604C and a surface 606. In the depicted example, the objects 604A, 604B and 604C are automobiles in a parking lot and have an assigned semantic label indicating the objects are automobiles. As such, the mower movement planning would avoid the automobiles as the mower 602 traverses the surface 606. To facilitate smooth movement of the mower 602 and accurate obstacle avoidance, the model 600 is produced in periodic process intervals, e.g., 100 mS or less.

EXAMPLE CLAUSES

A. An autonomous mower comprising: a plurality of stereo cameras; one or more processors; and one or more computer readable media having instructions stored thereon which, when executed by the one or more processors cause the one or more processors to perform the operations comprising: receiving image data from the plurality of cameras; determining segmentation data associated with the image data; determining depth data associated with the image data, the depth data associated with a distance to a portion of the environment represented in the image data; determining, based at least in part on the segmentation data, a subset of the depth data associated with a drivable surface; determining, based at least in part on the subset of the depth data, a surface model; determining, using the surface model, an object model representing an object in the environment; and controlling the autonomous system based at least in part on one or more of the surface model and the object model.

B. The autonomous mower of clause A, wherein determining the surface model comprises minimizing a distance of the depth data to a multi-variate polynomial.

C. The autonomous mower of clause A or B, wherein: the image data comprises a plurality of images received from the plurality of stereo cameras, and determining the segmentation data comprises inputting the image data into a neural network and receiving, from the neural network, the segmentation data.

D. The autonomous mower of clauses A-C, wherein the segmentation data comprises one or more of: drivable, sidewalk, non-drivable, or grass.

E. The autonomous mower of clauses A-D, wherein determining the surface model comprises performing a least squares optimization to determine a plurality of surface models, a surface model of the plurality of surface models associated with different subsets of the depth data.

F. The autonomous mower of clauses A-E, wherein determining the surface model further comprises performing outlier rejection.

G. The autonomous mower of clauses A-F, wherein determining the object comprises: identifying points in the depth data that meet or exceed a threshold distance from the surface model; and clustering, as the object model, points having a same semantic classification.

H. The autonomous mower of clauses A-G, wherein a plurality of surface models are fused into a rolling height map buffer based at least in part on a weighted average.

I. A method of generating a model of an environment proximate an autonomous mower, the method comprising: receiving image data from a plurality of sensors; determining segmentation data associated with the sensor data; determining depth data associated with a portion of the environment represented in the sensor data; determining, based at least in part on the segmentation data, a subset of the depth data associated with a drivable surface; determining, based at least in part on the subset of the depth data, a surface model; determining, using the surface model, an object model representing an object in the environment; and controlling the autonomous system based at least in part on one or more of the surface model and the object model.

J. The method of clause I, wherein determining the surface model comprises minimizing a distance of the subset of the depth data to a multi-variate polynomial.

K. The method of clause I or J, wherein: the plurality of sensors comprise a plurality of cameras; the sensor data comprises a plurality of images received from the plurality of cameras, and determining the segmentation data comprises inputting the image data into a neural network and receiving, from the neural network, the segmentation data.

L. The method of clauses I-K, wherein the segmentation data comprises one or more of: drivable, sidewalk, non-drivable, or grass.

M. The method of clauses I-L, wherein determining the surface model comprises determining a plurality of surface models using a least squares optimization, a surface model of the plurality of surface models associated with different subsets of the depth data.

N. The method of clauses I-M, wherein determining the surface model further comprises performing outlier rejection.

O. The method of clauses I-N, wherein determining the object comprises: identifying points in the depth data that meet or exceed a threshold distance from the surface model; and clustering, as the object model, points having a same semantic classification.

P. The method of clauses I-O, further comprising fusing a plurality of surface models and fusing a plurality of object models.

Q. One or more computer readable media having instructions stored thereon which, when executed by one or more processors cause the one or more processors to perform the operations comprising: receiving sensor data from a plurality of sensors; determining depth data associated with the sensor data, the depth data associated with a distance to a portion of the environment represented in the sensor data; determining a subset of the depth data associated with a drivable semantic classification; determining, based at least in part on the subset of the depth data, a surface model; determining, using the surface model, an object model representing an object in the environment; and controlling a system based at least in part on the surface model and the object model.

R. The one or more computer readable media of clause Q wherein the surface model comprises a multivariate polynomial, and wherein coefficients associated with the multivariate polynomial are estimated using a least squares algorithm.

S. The one or more computer readable media of clause Q or R, wherein determining the object model comprises: determining a set of depth data having a distance greater than or equal to a threshold distance from the height; and clustering the set of depth data.

T. The autonomous mower of clauses Q-S, wherein the drivable semantic classification comprises one or more of: grass, or sidewalk.

CONCLUSION

Here multiple examples have been given to illustrate various features and are not intended to be so limiting. Any one or more of the features may not be limited to the particular examples presented herein, regardless of any order, combination, or connections described. In fact, it should be understood that any combination of the features and/or elements described by way of example above are contemplated, including any variation or modification which is not enumerated, but capable of achieving the same. Unless otherwise stated, any one or more of the features may be combined in any order.

As above, figures are presented herein for illustrative purposes and are not meant to impose any structural limitations, unless otherwise specified. Various modifications to any of the structures shown in the figures are contemplated to be within the scope of the invention presented herein. The invention is not intended to be limited to any scope of claim language.

Where "coupling" or "connection" is used, unless otherwise specified, no limitation is implied that the coupling or connection be restricted to a physical coupling or connection and, instead, should be read to include communicative couplings, including wireless transmissions and protocols.

Any block, step, module, or otherwise described herein may represent one or more instructions which can be stored on a non-transitory computer readable media as software and/or performed by hardware. Any such block, module, step, or otherwise can be performed by various software and/or hardware combinations in a manner which may be automated, including the use of specialized hardware designed to achieve such a purpose. As above, any number of blocks, steps, or modules may be performed in any order or not at all, including substantially simultaneously, i.e. within tolerances of the systems executing the block, step, or module.

Where conditional language is used, including, but not limited to, "can," "could," "may" or "might," it should be understood that the associated features or elements are not required. As such, where conditional language is used, the elements and/or features should be understood as being optionally present in at least some examples, and not necessarily conditioned upon anything, unless otherwise specified.

Where lists are enumerated in the alternative or conjunctive (e.g., one or more of A, B, and/or C), unless stated otherwise, it is understood to include one or more of each element, including any one or more combinations of any number of the enumerated elements (e.g., A, AB, AC, ABC, ABB, etc.). When "and/or" is used, it should be understood that the elements may be joined in the alternative or conjunctive.

The invention claimed is:

1. An autonomous vehicle comprising:
   a plurality of stereo cameras;
   one or more processors; and
   one or more non-transitory computer readable media having instructions stored thereon which, when executed by the one or more processors cause the one or more processors to perform operations comprising:
      receiving image data from the plurality of stereo cameras, wherein the image data includes a plurality of pixels;
      determining segmentation data associated with the image data;
      determining depth data associated with the image data, the depth data associated with a distance to a portion of an environment represented in the image data;
      determining, based at least in part on the segmentation data, a subset of the depth data associated with a drivable surface;
      determining, based at least in part on the subset of the depth data, a surface model;
      determining, using the surface model, an object model representing an object in the environment, wherein using the surface model includes discretizing the surface model into cells, identifying pixels above a predefined distance above the drivable surface that are not associated with the drivable surface, determining whether a predefined number of pixels resides in each cell, and point clustering the pixels in the cells where the pixels meet or exceed the predefined number of pixels to generate the object model; and
      controlling the autonomous vehicle based at least in part on one or more of the surface model and the object model.

2. The autonomous vehicle of claim 1, wherein determining the surface model comprises minimizing a distance of the depth data to a multi-variate polynomial.

3. The autonomous vehicle of claim 2, wherein determining the surface model comprises performing a least squares optimization to determine a plurality of surface models, wherein each surface model of the plurality of surface models is associated with a different subset of the depth data.

4. The autonomous vehicle of claim 3, wherein determining the surface model further comprises performing outlier rejection.

5. The autonomous vehicle of claim 1, wherein:
the image data comprises a plurality of images received from the plurality of stereo cameras, and
determining the segmentation data comprises inputting the image data into a neural network and receiving, from the neural network, the segmentation data.

6. The autonomous vehicle of claim 5, wherein the segmentation data comprises one or more of:
drivable,
sidewalk,
non-drivable, or
grass.

7. The autonomous vehicle of claim 1, wherein determining the object model comprises:
identifying points in the depth data that meet or exceed a threshold distance from the surface model; and
clustering, as the object model, the points having a same semantic classification.

8. The autonomous vehicle of claim 1, wherein determining a surface model includes determining a plurality of surface models and the operations further comprise fusing the plurality of determined surface models into a rolling height map buffer.

9. A method of generating a model of an environment proximate an autonomous vehicle, the method comprising:
receiving image data from a plurality of sensors, wherein the image data includes a plurality of pixels;
determining segmentation data associated with the image data;
determining depth data associated with a portion of the environment represented in the image data;
determining, based at least in part on the segmentation data, a subset of the depth data associated with a drivable surface;
determining, based at least in part on the subset of the depth data, a surface model;
determining, using the surface model, an object model representing an object in the environment, wherein using the surface model includes discretizing the surface model into cells, identifying pixels above a predefined distance above the drivable surface that are not associated with the drivable surface, determining whether a predefined number of pixels resides in each cell, and point clustering the pixels in the cells where the pixels meet or exceed the predefined number of pixels to generate the object model; and
controlling the autonomous vehicle based at least in part on one or more of the surface model and the object model.

10. The method of claim 9, wherein determining the surface model comprises minimizing a distance of the subset of the depth data to a multi-variate polynomial.

11. The method of claim 10, wherein determining the surface model comprises determining a plurality of surface models using a least squares optimization, wherein each surface model of the plurality of surface models is associated with a different subset of the depth data.

12. The method of claim 11, wherein determining the surface model further comprises performing outlier rejection.

13. The method of claim 9, wherein
the plurality of sensors comprise a plurality of cameras, the image data comprises a plurality of images received from the plurality of cameras, and
determining the segmentation data comprises inputting the image data into a neural network and receiving, from the neural network, the segmentation data.

14. The method of claim 13, wherein the segmentation data comprises one or more of:
drivable,
sidewalk,
non-drivable, or
grass.

15. The method of claim 9, wherein determining the object model comprises:
identifying points in the depth data that meet or exceed a threshold distance from the surface model; and
clustering, as the object model, points having a same semantic classification.

16. The method of claim 9, wherein determining a surface model includes determining a plurality of surface models and determining an object model includes determining a plurality of object models, the method further comprising fusing the plurality of determined surface models and fusing the plurality of determined object models.

17. One or more non-transitory computer readable media having instructions stored thereon which, when executed by one or more processors cause the one or more processors to perform operations comprising:
receiving image data from a plurality of sensors, wherein the image data includes a plurality of pixels;
determining depth data associated with the image data, the depth data associated with a distance to a portion of an environment represented in the image data;
determining a subset of the depth data associated with a drivable surface;
determining, based at least in part on the subset of the depth data, a surface model;
determining, using the surface model, an object model representing an object in the environment, wherein using the surface model includes discretizing the surface model into cells, identifying pixels above a predefined distance above the drivable surface that are not associated with the drivable surface, determining whether a predefined number of pixels resides in each cell, and point clustering the pixels in the cells where the pixels meet or exceed the predefined number of pixels to generate the object model; and
controlling an autonomous vehicle based at least in part on the surface model and the object model.

18. The one or more non-transitory computer readable media of claim 17 wherein the surface model comprises a multivariate polynomial, and
wherein coefficients associated with the multivariate polynomial are estimated using a least squares algorithm.

19. The one or more non-transitory computer readable media of claim 18, wherein determining the object model comprises:
determining a set of depth data having a distance greater than or equal to a threshold distance from a height; and
clustering the set of depth data.

20. The one or more non-transitory computer readable media of claim 17, wherein the drivable surface comprises one or more of:
grass, or
sidewalk.

* * * * *